(12) United States Patent
Sakamoto (10) Patent No.: US 9,361,050 B2
(45) Date of Patent: Jun. 7, 2016

(54) MANAGEMENT SYSTEM AND MANAGEMENT METHOD

(71) Applicant: CANON KABUSHIKI KAISHA, Tokyo (JP)

(72) Inventor: Koji Sakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/639,368

(22) Filed: Mar. 5, 2015

(65) Prior Publication Data

US 2015/0268902 A1  Sep. 24, 2015

(30) Foreign Application Priority Data

Mar. 19, 2014 (JP) ................. 2014-056545

(51) Int. Cl.
 *G06F 3/12* (2006.01)
 *G06F 11/07* (2006.01)
 *G06Q 10/06* (2012.01)

(52) U.S. Cl.
 CPC ............. *G06F 3/121* (2013.01); *G06F 3/123* (2013.01); *G06F 3/1288* (2013.01); *G06F 11/07* (2013.01); *G06Q 10/06* (2013.01)

(58) Field of Classification Search
 USPC ........................................................ 358/1.14
 See application file for complete search history.

(56) References Cited

U.S. PATENT DOCUMENTS

| | | | | |
|---|---|---|---|---|
| 2008/0133179 A1* | 6/2008 | Kanai | ................. | G06F 11/0709 702/184 |
| 2009/0089443 A1* | 4/2009 | Tanaka | .................... | G06F 15/16 709/228 |
| 2010/0259789 A1* | 10/2010 | Hadano | ................... | G06F 3/121 358/1.15 |
| 2011/0026067 A1 | 2/2011 | Hamaguchi | | |
| 2011/0087724 A1* | 4/2011 | Haga | ................. | H04N 1/00244 709/202 |
| 2011/0216359 A1* | 9/2011 | Kamisuwa | ................ | G06F 3/12 358/1.15 |
| 2013/0201507 A1* | 8/2013 | Kamisuwa | ........... | H04N 1/0097 358/1.13 |
| 2014/0085660 A1* | 3/2014 | Kamisuwa | ......... | G06K 15/1803 358/1.14 |

FOREIGN PATENT DOCUMENTS

JP    2009-276446 A    11/2009

* cited by examiner

*Primary Examiner* — Ngon Nguyen
(74) *Attorney, Agent, or Firm* — Fitzpatrick, Cella, Harper & Scinto (57) ABSTRACT

A management system collects operation information of a network device and comprises a management unit configured to manage a condition and a period for distributing a setting value to the network device; a reception unit configured to receive the operation information of the network device; an acquisition unit configured to acquire device information of the network device; a determination unit configured to determine whether or not the operation information meets the condition; a decision unit configured to decide a setting value to be distributed to the network device; and a response unit configured to return the determined setting value to the network device when the acquisition of the setting value is requested from the network device via a network within the period. The response unit does not return the decided setting value to the network device when the acquisition of the setting value is requested outside of the period.

6 Claims, 9 Drawing Sheets

| Ttarget model identifier: MFPxx130, MFPxx140, ···MFPxx220 | | | |
|---|---|---|---|
| Feeding roller counter | 0 | 10000 | 20000 |
| Detected seconds of delayed jam sensor (ms) | 300 | 350 | 400 |

| Condition type | Condition value |
|---|---|
| Period (days) | 30 |
| Firmware version | 3.20 |
| Device identifier | DEV00154 |
| .... | |

| Maintenance screen |
|---|
| Receive change of setting value from remote monitoring server |
| Is setting value below applied? |
| Yes    No |
| Setting item: Detected seconds of delayed jam sensor (ms) |
| Setting value: 350 |
| Satisfied condition: Feeding roller counter (Value:10003) |

| Transmission task execution history ||||
|---|---|---|---|
| Task creation date and hour | Setting value details | Task execution date and hour | Status |
| 2013/10/3 | Detected seconds of delayed jam sensor | 2013/10/5 | Normally executed |
| 2013/10/6 | Position adjustment of feeding roller | 2013/10/11 | Not applied by maintenance person |
| 2013/10/10 | Threshold adjustment for detection of frequent occurrences of jams | ------- | Not executed |

| | | | | |
|---|---|---|---|---|
| 1001 | Target model identifier: MFPxx130, MFPxx140, ・・・MFPxx220 | | | |
| 1002 | Feeding roller counter | 0 | 10000 | 20000 |
| 1003 | Feeding roller counter (During maintenance mode) | 0 | 9990 | 19990 |
| 1004 | Detected seconds of delayed jam sensor (ms) | 300 | 350 | 400 |

FIG. 11

MANAGEMENT SYSTEM AND MANAGEMENT METHOD

BACKGROUND OF THE INVENTION

1. Field of the Invention

The present invention relates to a management system and a management method, and in particular, relates to a management system and a management method that enable remotely updating a setting value to a network device including an image forming apparatus.

2. Description of the Related Art

A maintenance person who performs a maintenance operation sometimes resets a parameter for a network device including an image forming apparatus so as to be smoothly utilized considering the utilization status thereof when he/she visits a customer. Japanese Patent Laid-Open No. 2009-276446 discloses a technique for automatically adjusting the parameter according to the utilization status of the network device, without depending on the parameter setting set by the maintenance person. For example, when a component whose consumption degree exceeds a certain value is used, in a job that is executed by a user, there is also a technique in which the execution of a substitutive job not using the component is selected and presented to the user. In contrast, in recent years, a person in charge of a selling company can remotely perform a setting change in the network device in the market by using a remote monitoring system.

While Japanese Patent Laid-Open No. 2009-276446 discloses that a behavior of the network device can be automatically changed considering the utilization status, it does not suggest a method for remotely changing the setting value. For example, there is a case in which the person in charge of the selling company wants to change the condition of the utilization status and the setting value so as to be automatically changed at once, considering the utilization status in the market, the distribution condition of firmware, and the like. Additionally, the transmitted setting value is not applied when the network device is not connected to a network or a power source is turned off. Subsequently, the setting value may be changed at an unintended timing of the person in charge of the selling company after a passage of time. Moreover, trouble may occur if the setting value that has been set in the network device by the maintenance person at the timing of his/her visit is automatically changed by the remote monitoring system.

SUMMARY OF THE INVENTION

The present invention provides a management system that prevents a setting value that is automatically transmitted to the network device from being applied in a situation that is not intended by the maintenance person.

The present invention is a management system that collects operation information of a network device comprising: a management unit configured to manage a condition and a period for distributing a setting value to the network device; a reception unit configured to receive the operation information of the network device; an acquisition unit configured to acquire device information of the network device; a determination unit configured to determine whether or not the operation information of the network device meets the condition; a decision unit configured to decide the setting value to be distributed to the network device; and a response unit configured to return the decided setting value to the network device when the acquisition of the setting value is requested from the network device via a network within the period, wherein the response unit does not return the decided setting value to the network device when the acquisition of the setting value is requested outside of the period.

According to the present invention, the maintenance person can change the setting value at once considering the utilization status and the distribution status of firmware, and it is possible to prevent the setting value that is automatically transmitted being applied in the situation not intended by the maintenance person.

Further features of the present invention will become apparent from the following description of exemplary embodiments (with reference to the attached drawings).

DESCRIPTION OF THE EMBODIMENTS

Hereinafter, embodiments of the present invention will be described with reference to the drawings.

First Embodiment

Figure 1:
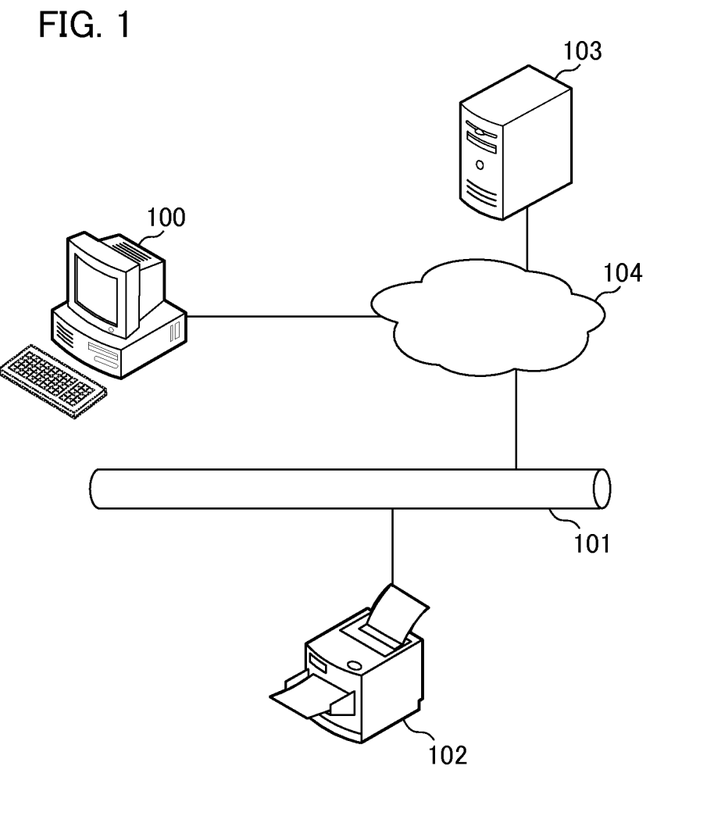
FIG. 1 is a diagram illustrating an entire configuration of a management system.

First, a description will be given of a management device 103 and each device that communicates with the management device 103 in a management system according to the present embodiment, with reference to FIG. 1. FIG. 1 illustrates a situation in which the management device 103 is connected to a network device 102 to be managed and a client device 100 for requesting the management device 103 to acquire information through a network 101 and internet 104. The present embodiment describes the network device 102 serving as an image forming apparatus (printing apparatus). However, the present embodiment explains a typical embodiment of the present invention, and does not limit the applicable range of the present invention.

The management device 103 is a server for centralized management of the network device 102 in a client environment, is arranged on the internet 104, and is capable of managing a plurality of devices in the client environment by collecting operation information of the network device 102. The network device 102 is an image forming apparatus provided with a printer, a FAX, and a copy function. The network device 102 is capable of transmitting management information (device information), for example, the number of printing sheets, a consumption degree of the component configuring the device, firmware version information, and the operation information to the management device 103. Note that, in the present embodiment, the device information includes model information of the network device and the version information of the firmware of the network device. Additionally, the operation information includes counter information indicating the consumption degree of each component that operates in the network device, status information of the network device, or error information of the network device. The client device 100 is a terminal such as a personal computer that is operated for the management device 103 by the person in charge of the selling company through the network 101. The client device 100 inputs the setting value that is requested to be remotely changed to each network device 102. The setting value of the network device 102 will be described in detail below.

Note that in FIG. 1, the entire system is configured by four devices, but the system is not necessarily configured by four devices. In the present embodiment, the local network 101 and the network device 102 can be either single or plural. Additionally, the management device 103 may be configured by a plurality of devices per function. Additionally, the client device 100 is not necessarily a personal computer, and it may be an information processing device having a similar function such, as a mobile terminal. Additionally, in the present embodiment, the network device 102 directly transmits its management information to the management device 103, but, for example, an agent device for intermediating this may acquire information of the network device 102 and may transmit it to the management device 103. Additionally, such agent device may manage a plurality of network devices 102 on a local network.

Figure 2:
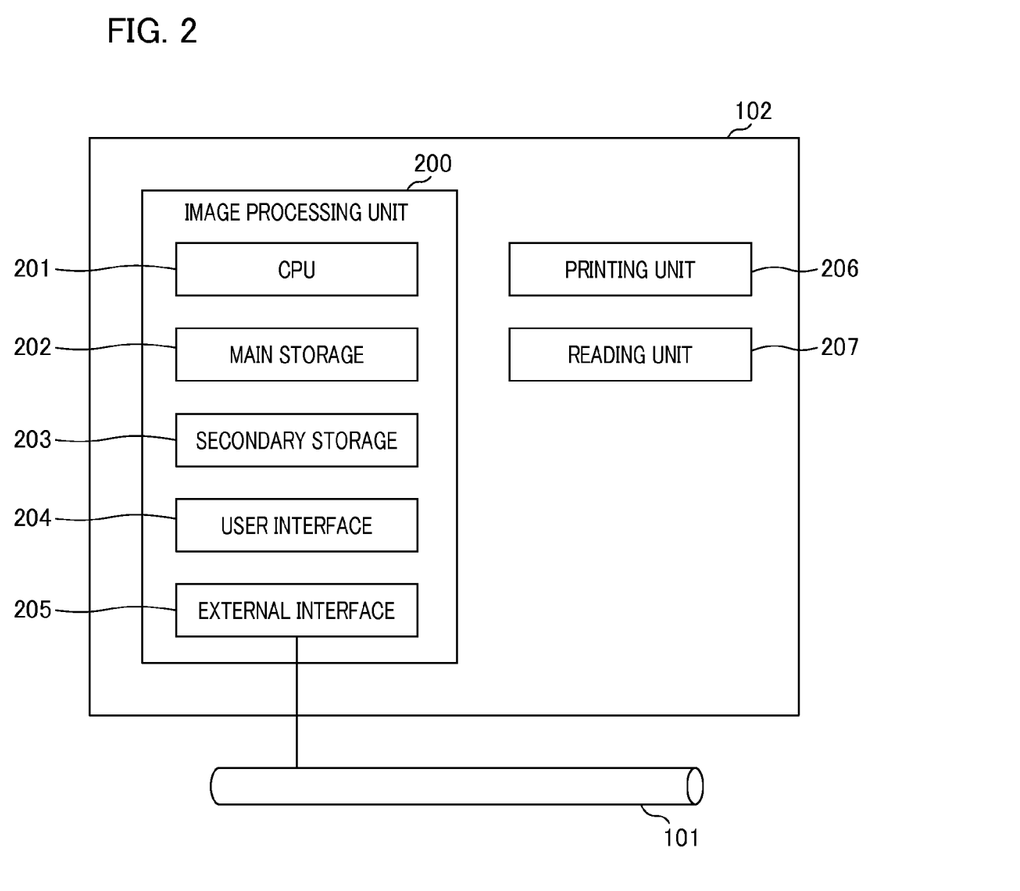
FIG. 2 is a diagram illustrating a hardware configuration of a network device.

Next, a description will be given of a hardware configuration that configures the management device 103 in FIG. 1, with reference to FIG. 2. FIG. 2 is a block diagram illustrating a hardware configuration of the network device 102. The network device 102 includes an image processing unit 200, a CPU 201, a main storage 202, a secondary storage 203, a user interface 204, an external interface 205, a printing unit 206, and a reading unit 207.

The CPU (Central Processing Unit) 201 is a unit that executes a predetermined program and provides instructions for various controls of the network device 102. The main storage 202 is a work memory used when the CPU 201 executes the program and it is realized, for example, by a RAM (Random Access Memory). The secondary storage 203 is realized by a HDD (Hard Disk Drive) or a SSD (Solid State Drive). The secondary storage 203 stores an application program. Various programs stored in the secondary storage 203 are loaded into the main storage 202 when the CPU 201 executes the program. The user interface 204 is a unit having a function that receives an operation input by the user and it is realized by a touch operable panel or the like. The external interface 205 can receive data from an external device and can transmit the data to the external device. Various information stored in the secondary storage 203 can be provided to the outside through a protocol, for example, HTTP (Hypertext Transfer Protocol) and SNMP (Simple Network Management Protocol). For example, the external device includes an external storage such as an external HDD and a USB memory, a computer connected through the network, and other network devices. In the present embodiment, the external device communicates in order to exchange information with the management device 103.

Figure 3:
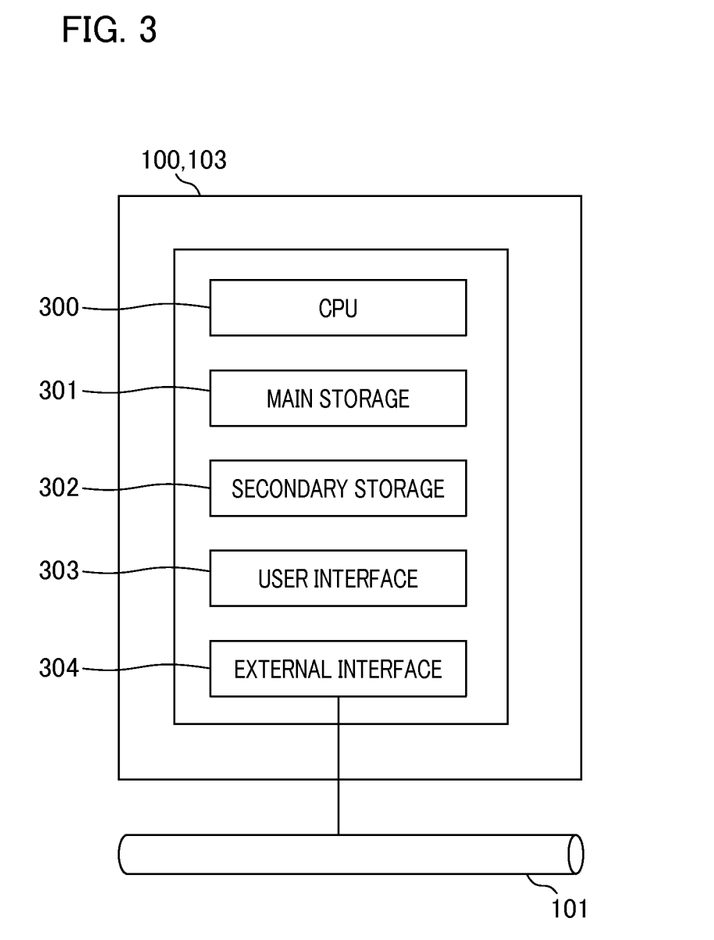
FIG. 3 is a diagram illustrating a hardware configuration of a management device and a client device.

Next, a description will be given of a hardware configuration of an information processing device including the client device 100 and the management device 103, with reference to FIG. 3. FIG. 3 is a block diagram illustrating an internal structure of the information processing device. This information processing device includes a CPU 300, a main storage 301, a secondary storage 302, a user interface 303, and an external interface 304. The descriptions of the details of the CPU 300 and the main storage 301 are omitted because they are same as those included in the network device 103. The secondary storage 302 stores various programs including an application program and an OS (Operating System).

Additionally, in the management device 103, the secondary storage 302 stores, for example, a printing history, setting value information of the network device 102, and firmware information of the network device 102. The user interface 303 is a unit that has the function of receiving the operation input by the user. It receives a signal according to the operation of the user by using a keyboard, a mouse, and the like. The external interface 304 is connected to the internet 104 and enables communicating with other devices.

Figure 4:
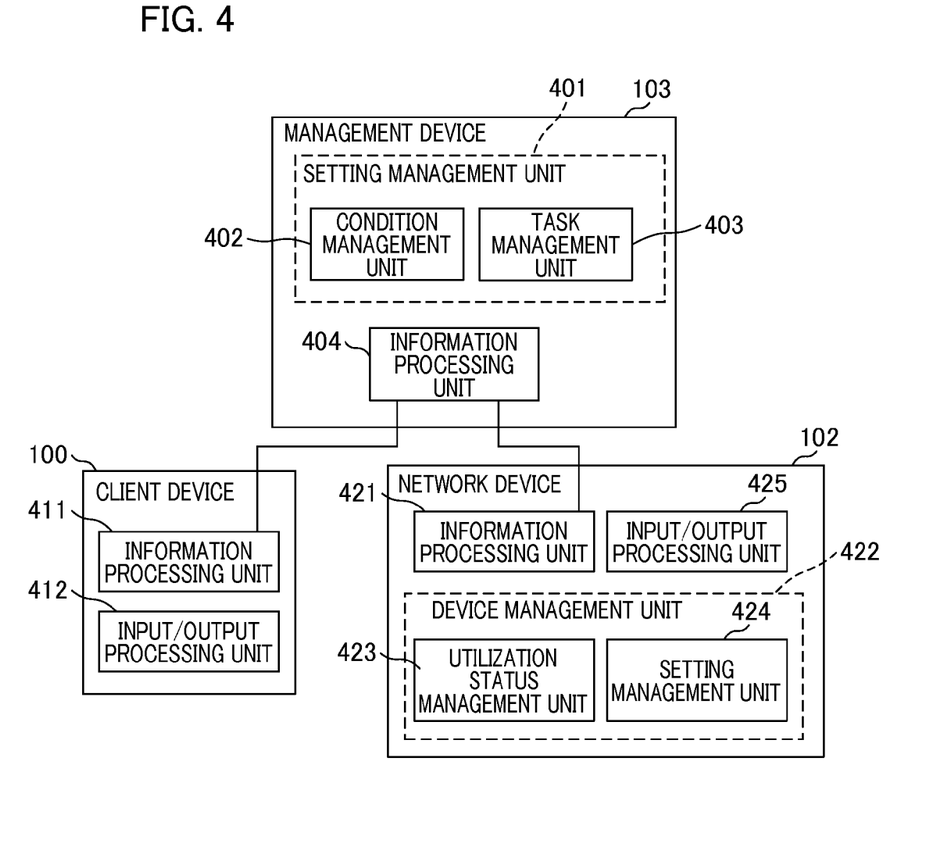
FIG. 4 is a functional block diagram of each device in the management system.

Next, with reference to FIG. 4, a description will be given of a software configuration for each device cooperating with the management device 103 of FIG. 1. FIG. 4 is a functional block diagram of each device. First, a description will be given of the software configuration of the network device 102.

The network device 102 has an information processing unit 421, a device management unit 422, and an input/output processing unit 425. The information processing unit 421 communicates with the management device 103 via the internet 104, transmits the information of the network device 102, and receives the required management information. The device management unit 422 includes a utilization status management unit 423 and a setting management unit 424. The utilization status management unit 423 manages, for example, a print processing execution in the network device 102, the version information of the firmware, an error such as a paper jam, alarm information, and consumption degree information of each component. The setting management unit 424 manages the setting value in the network device 102, updates the setting value as necessary, and presents it to the outside. The input/output processing unit 425 displays the information on a panel through the user interface 303 and the external interface 304 that are loaded into the network device and receives the input operation by the user or the maintenance person.

The client device 100 has an information processing unit 411 and an input/output processing unit 412. The information processing unit 411 has a function that exchanges the information with the management device 103 via the internet 104. Additionally, the input/output processing unit 412 receives the input by the user and performs a process for presenting the information to the user. A general browser or an exclusive application for requesting acquisition of alarm information is available as an embodiment of the input/output processing unit 412.

Next, a description will be given of the software configuration of the management device 103. The management device 103 has a setting management unit 401 and an information processing unit 404. The setting management unit 401 has a condition management unit 402 and a task management unit 403. The condition management unit 402 manages, for example, a setting value condition table that manages a combination of the setting value and a transmission condition that are input by the person in charge of the selling company, and an exclusion condition under which the setting value is not transmitted to the network device 102. The task management unit 403 has a function that creates and holds a task for transmitting the setting value that is decided by the condition management unit 402 to the network device 102. Here, the created task is executed when the acquisition request of the setting value is received from the network device 102. The information processing unit 404 receives writing to the setting value condition table by the person in charge of the selling company from the client device 100. Additionally, it receives the transmission of the information of the number of printing sheets and the consumption degree of the component and the acquisition request of the setting value from the network device 102.

Figure 5:
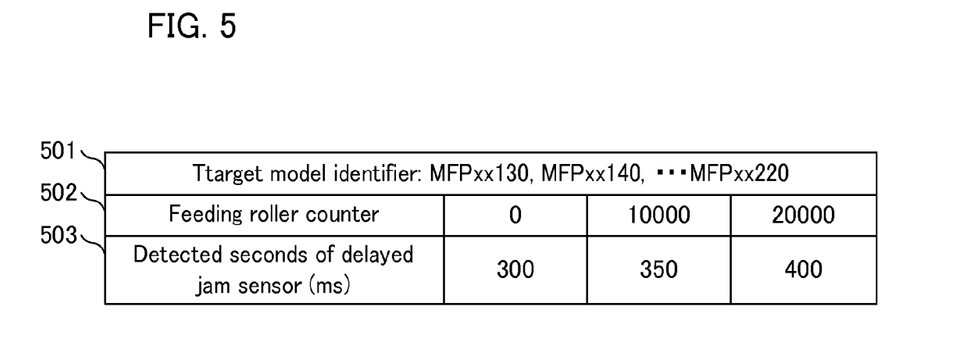
FIG. 5 is a diagram illustrating one example of a setting value condition table in the management device.

FIG. 5 illustrates one example of the setting value condition table included in the condition management unit 402. In FIG. 5, the feeding speed becomes slow as a feeding roller of the network device 102 rotates and wears away, whereby, for example, a delayed jam sensor causes a false detection of a jam (paper jam). Accordingly, FIG. 5 exemplifies the setting values in which the setting values are changed so as to enlarge the detected number of seconds of the delayed jam sensor when the rotating number of the feeding roller exceeds a given fixed value.

A target model identifier 501 shows a list of the models of the network device 102 that applies the transmission condition of the table. A transmission condition 502 indicates a status of the network device 102, which is to be referenced, as a condition. The setting value 503 indicates which setting value is applied for each transmission condition. Note that the detected number of seconds of the delayed jam sensor is set at 300 milliseconds and above as an initial value to detect the jam when a feeding roller counter is zero, in the example of FIG. 5. Additionally, when the feeding roller counter exceeds 10,000 and 20,000, the detected number of seconds of the delayed jam sensor is respectively flexibly set to 350 milliseconds and above, and to 400 milliseconds and above to detect the jam. The condition management unit 402 has the setting value condition tables in FIG. 5 for each type of the setting value. Subsequently, when a new setting value and the transmission condition of the setting value are input, a new table is created and the setting value and the transmission condition are stored therein.

Figure 6:
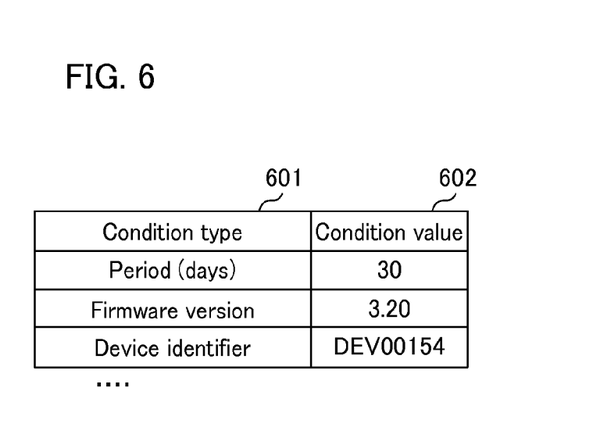
FIG. 6 is a diagram illustrating one example of an exclusion condition table in the management device.

FIG. 6 is a diagram illustrating one example of the exclusion condition table included in the condition management unit 402. An exclusion condition type 601 is capable of previously storing the type of the exclusion condition, for example, a period (days) and a firmware version. A condition value 602 indicates a value corresponding to the condition type 601. For example, in a case where "the period (days)" is stored in the condition type 601 and "30" is stored in the condition value 602, it is determined that the exclusion condition is satisfied if the acquisition of the setting value from the network device exceeds 30 days since the register of the setting value transmission condition. The exclusion condition is registered while simultaneously receiving an input, for example, when the person in charge of the selling company inputs the setting value and the transmission condition. Additionally, the value may be automatically set by a function of the present invention. Note that the details about when the value may be automatically set will be described below.

Figure 7:
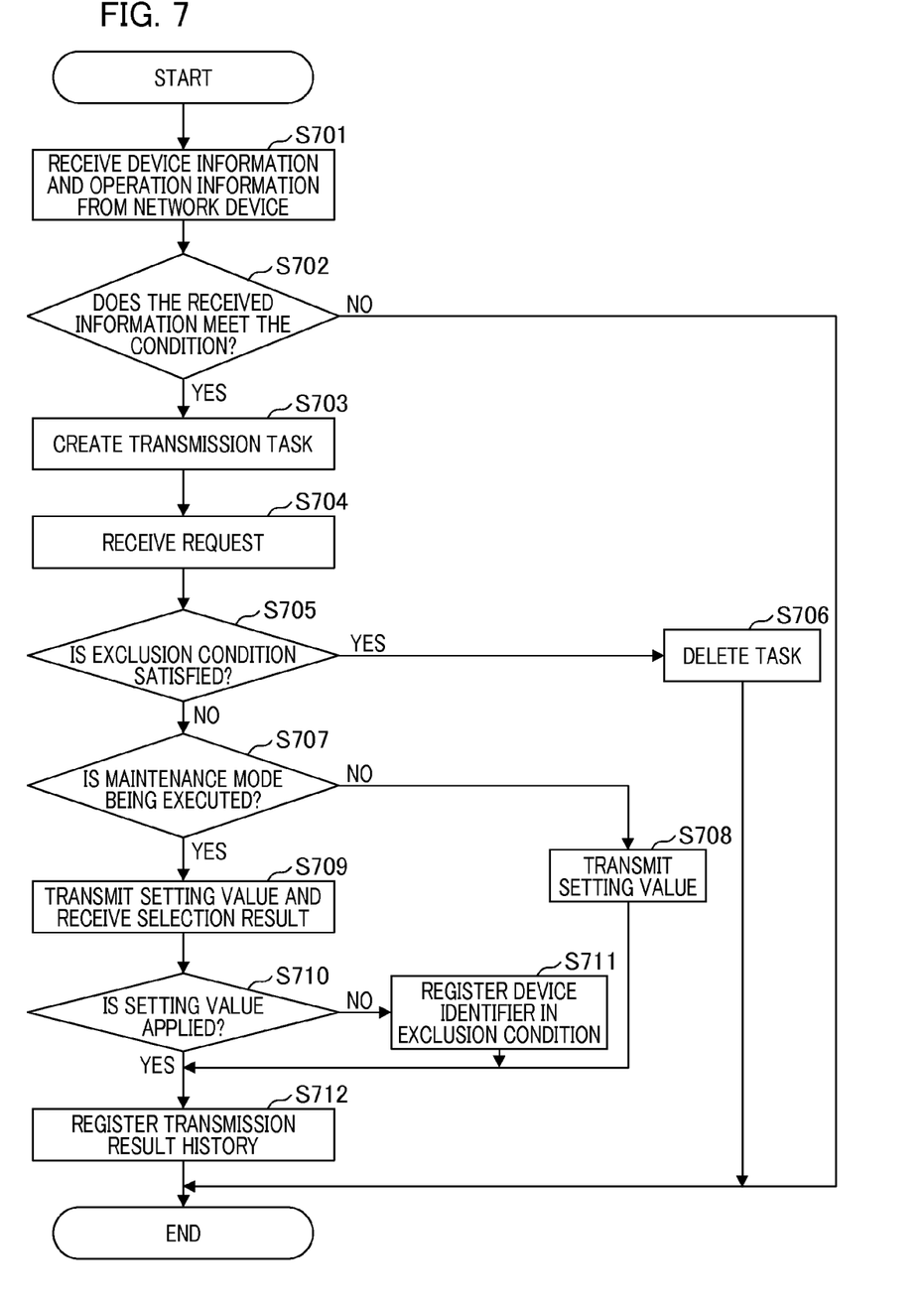
FIG. 7 is a flowchart of a process for transmitting a setting value to the network device.

Next, a method of transmitting an appropriate setting value to the network device 102 by the management device 103 will be described by using a flowchart of FIG. 7. The principal unit of the process is the condition management unit 402 in the management device 103. Additionally, the input of the setting value to be transmitted to the network device 102, the condition for transmitting the setting value, and the exclusion condition have been previously received via the client device 100, and the creation of the setting value condition table (FIG. 5) and the exclusion condition table (FIG. 6) has been completed before carrying out the process.

First, in step S701, the device information, for example, the model information, and the operation information, for example, the number of printing sheets and the consumption degree of the component, are acquired and received from the network device 102, and the process proceeds to step S702. Next, in step S702, the above information received from the network device 102 is compared with the target model identifier 501 and the transmission condition 502 in the setting value condition table shown in FIG. 5, and is determined as to whether or not the network device 102 satisfies the transmission condition. That is, it is determined whether or not the received operation information meets the condition. The process proceeds to step S703 when the transmission condition is satisfied (Yes), and the process ends when the transmission condition is not satisfied (No).

Next, in step S703, the setting management unit 401 is requested to create a task to transmit the setting value to the network device according to the above condition, and the process proceeds to step S704. Next, in step S704, the acquisition request of the setting value from the network device 102 is received. At this time, the information about whether or not the maintenance mode (operation mode for service) is being currently executed in the target network device is also received. Next, in step S705, it is determined whether or not the exclusion condition is satisfied, in other words, whether or not the acquisition request of the setting value from the network device is within the period. The determination of the exclusion condition is done based on an exclusion condition management table included in the condition management unit 402. In step S705, when the exclusion condition is satisfied (Yes), in other words, when it is within the period, the process proceeds to step S706. In contrast, when the exclusion condition is not satisfied (No), in other words, when outside of the period, the process proceeds to step S707.

Subsequently, in step S707, it is determined whether or not the maintenance mode is being executed in the network device 102 based on the information that is simultaneously received when the acquisition request of the setting value is received in the process of step S704. When the maintenance mode is being executed (Yes), the process proceeds to step S709. In contrast, when the maintenance mode is not being executed (No), the process proceeds to step S708. In addition, in step S708, the setting value according to the transmission condition is transmitted to the network device 102. That is, a response is performed to the acquisition request of the setting value from the network device 102.

In step S709, the setting value is transmitted to the network device 102, and a display unit (not illustrated) of the network device 102 is requested to display a confirmation screen shown in FIG. 8, which is described below. Subsequently, a selection result indicating whether or not the setting value set by the maintenance person has been applied is received from the network device 102, and the process proceeds to step S710. In step S710, it is determined whether or not the setting value is applied. The process proceeds to step S712 when the setting value is applied (Yes), and the process proceeds to step S711 when the setting value is not applied (No). Additionally, in step S711, the identifier of the network device 102, at which the setting value is not applied, is registered in the exclusion condition table (FIG. 6), and the process proceeds to step S712. In step S712, the transmitted setting value and the result applied to the network device 102 are registered as a task execution history, and the process ends.

Figure 8:
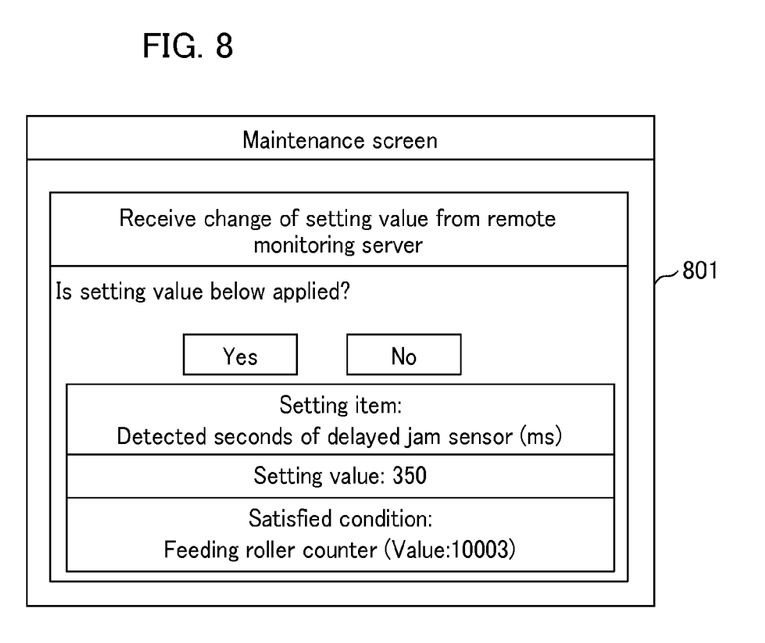
FIG. 8 is a diagram illustrating one example of a display screen that is displayed to a maintenance person.

FIG. 8 illustrates one example of a confirmation screen 801 that is displayed in a case where a task that has not yet been transmitted is on the management device 103 when the maintenance mode opens on the network device 102. The confirmation screen 801 is displayed on the network device 102 in the process of step S709 of the flowchart of FIG. 7. The confirmation screen 801 displays the setting item to be changed and its value, and the reason for changing the setting value. Moreover, it is possible to receive a selection input operation indicating whether or not the setting value to be changed is applied. Additionally, when there is a plurality of setting values to be changed, the selection input operation is received for each of them.

Figure 9:
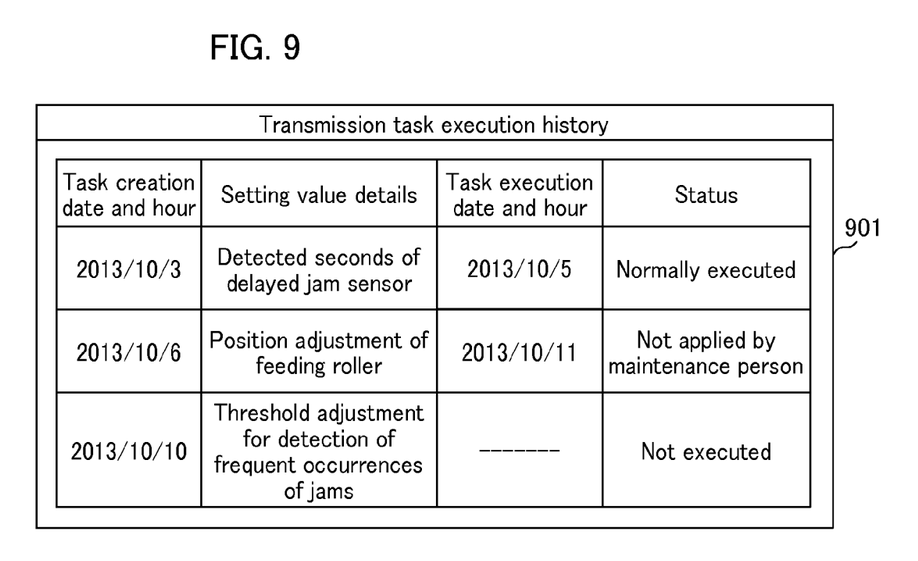
FIG. 9 is a diagram illustrating one example of a history confirmation screen that indicates a transmission status to the network device.

FIG. 9 illustrates one example of a task execution history screen 901 for displaying the task execution history that is managed by the task management unit 403 on the management device 103 on the client device 100. The task execution history screen 901 displays, for example, the creation date for each task, the details of the setting value to be transmitted by using the task, the execution date and hour, and the execution result. The task execution history screen 901 is registered through the process of step S712 in the flowchart of FIG. 7. Here, in the process of step S710, particularly, when the setting value is not applied, the matter is clearly displayed. In the present embodiment, in FIG. 9, displaying a text "not-applied by the maintenance person" allows the user to confirm that the setting value was not applied.

The above configuration allows, for example, the person in charge of the selling company to register the transmission condition of the setting value and the setting value to be automatically changed at once, by taking into consideration the utilization status in the market and the distribution condition of the firmware. Additionally, the previous registering of the period and the firmware version as the exclusion condition can prevent the registered setting value from being changed at a timing not intended by the person in charge of the selling company after the passage of time. Moreover, there is a configuration in which the maintenance person receives the selection of whether or not the setting value to be changed is applied when the maintenance mode is executed. Hence, it is possible to prevent a setting value that is not assumed for the maintenance person from being applied after receiving the transmission of a setting value from the management device during the change and the confirmation of the setting value in the maintenance mode by the maintenance person.

Additionally, the example of the setting value condition table in FIG. 5 shows an example for preventing the false detection of the jam (paper jam) caused by the wear of the feeding roller on the network device 102. However, applying the present embodiment makes it possible to handle other situations. For example, in the network device 102, when a photoreceptor unit deteriorates, the printing paper is difficult to peel off from it and a jam caused by the paper that is wound around it during printing often occurs. Adjustment of writing coordinates in the paper during printing makes it possible to reduce the occurrence jamming. Moreover, the value of the consumption degree is reset when the photoreceptor unit is exchanged by a new one, whereby the writing coordinates can be returned to the initial value again.

As another example, when the firmware of the network device 102 in the market needs a correction as a fundamental countermeasure against a failure that occurs in the network device 102, a temporary countermeasure accompanying the change of the setting value may be performed. This is because a long time is required for correcting the firmware and distributing the corrected firmware even if the fundamental reason is improved by the correction of the firmware. Accordingly, applying the present embodiment makes enables transmitting the setting value according to the transmission condition to the network device 102 that needs the correction of the firmware in the market. Moreover, designating the version of the firmware as the exclusion condition enables the control not to transmit the setting value to the network device 102 to which the revised firmware is applied.

Here, a description will be given of a specific example in which the failure of the network device 102 is corrected by upgrading the version of the firmware. First, there is a case in which information about a small remaining quantity of the toner is reported at many times from a model due to a failure of the detecting logic with regard to the small remaining quantity of the toner in the model. In this case, many report mails may affect user's business and may strain a communication pathway. Accordingly, applying the present embodiment makes it possible to register the setting and the transmission in the model where the failure occurs so as to change a threshold of the remaining quantity of the toner, which determines that the toner quantity is small.

Moreover, as another example, the frequent occurrences of the jams in the network device 102 due to the transmission of the setting value are suppressed. The network device 102 has the setting value, which becomes a standard for determining an event on the device as the jam, and a determining logic. Some combinations of this setting value and the determining logic do not effectively work and may cause the failure detection of the jam. Accordingly, it is contemplated that the corrected setting value is transmitted from the management device 103 and set in the network device 102 by applying the present embodiment. The transmission of the setting value is not performed for the model at which the determining logic has been corrected according to the correction of the firmware. Thereby, it is possible to reduce the frequent occurrences of the jams of the network device prior to start of the correction of the firmware.

Moreover, as another example, color density of the network device is controlled. The network device 102 typically controls density of various kinds of toners such as CMYK (cyan (C), magenta (M), yellow (Y), black (K)), and realizes various color tints in the color printing. However, unevenness in the toner density of each color during printing may occur depending on the model and the characteristic of the toner. For example, yellow is more clearly printed on a printing material due to the influence of the toner density. The control of this toner density is realized by a logic that is included in the firmware of the image forming apparatus, whereby it is assumed that the inconvenience can be improved by correcting the firmware. Accordingly, as a temporary countermeasure before distribution of the firmware, the density of the CMYK toners may be adjusted by the change of the setting value. Accordingly, applying the present embodiment makes it possible to transmit the setting value for adjusting the density of CMYK toners only to the model at which the correction by the firmware has not been performed.

As described above, in the present embodiment, the process in which the setting value and the transmission condition of the setting value are registered in the management device 103 and then the setting value is transmitted to each network device 102 is described. Note that the configurations of the network device 102 and the management device 103, and the configuration of a software module, the information table, the flow from the reception of the acquisition request of the setting value to the history registration of the transmission result of the setting value are indicated, but these are one example, and the present invention is not limited to this.

Second Embodiment

In the first embodiment, the configuration in which the setting value of the network device 102 is changed when the network device 102 satisfies the specified condition is described. Additionally, the configuration in which the setting value is not transmitted when the setting value is acquired from the network device 102 after the passage of time since the setting value has been registered in the management device is described. Moreover, the configuration for preventing the setting value from being applied when the maintenance person is opening the maintenance mode in the case in which setting value is immediately transmitted when the maintenance mode is being executed on the network device 102 is described.

However, there is a possibility that the transmission condition of the setting value will be satisfied if the test printing accompanying the maintenance is executed by the maintenance person. Additionally, the transmission condition may be satisfied by the printing executed by the user immediately after maintenance has been performed by the maintenance person. In this case, the setting value is changed immediately after the setting and the confirmation by the maintenance person. Accordingly, in the second embodiment, a method for preventing the transmission of the setting value immediately after the change of the setting value by the maintenance person is described.

The detailed descriptions in relation to the management device 103 and each device that communicate with the management device 103 in the second embodiment are omitted because they are identical to those in the first embodiment. Additionally, the hardware configuration and the software configuration of the information processing device including the network device 102, the client device 100, and the management device 103 are omitted because they are identical to those in the first embodiment.

Figure 10:
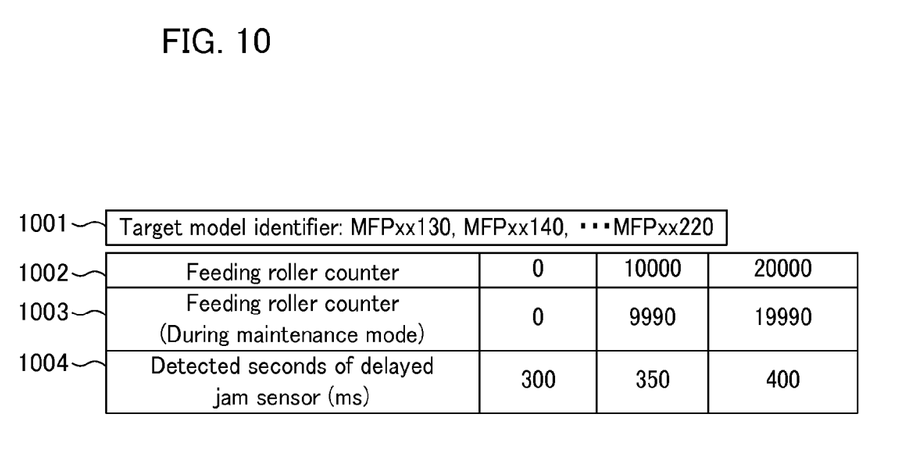
FIG. 10 is a diagram illustrating one example of a setting value condition table according to second embodiment.

FIG. 10 illustrates one example of the setting value condition table included in the condition management unit 402 in the second embodiment. The setting value condition table in FIG. 10 exemplifies setting values in which the setting value is changed so as to enlarge the detected number of seconds of the delayed jam sensor when the rotating number of the feeding roller exceeds a given fixed value. A target model identifier 1001 stores a list of the model of the network device that applies the condition of the table. A utilization status condition 1002 stores a condition of the referenced network device. A utilization status condition 1003 during the maintenance mode stores another utilization status condition that differs from the utilization status condition 1002. A setting value 1004 shows which setting value is applied for each condition.

In the example of FIG. 10, the detected number of seconds of the delayed jam sensor is set at 300 milliseconds and above as an initial value to detect the jam when the feeding roller counter is zero. Additionally, when the utilization status is received from the network device during an ordinary time, the detected number of seconds of the delayed jam sensor is set at the 350 milliseconds and above to detect the jam when the feeding roller counter exceeds 10,000. However, when the maintenance mode is being executed, the detected number of seconds of the delayed jam sensor is set at 350 milliseconds and above when the feeding roller counter exceeds 9,990, if not exceeding 10,000. The condition management unit 402 has the setting value condition table of FIG. 10 for each type of the setting value. Subsequently, when a new setting value and the transmission condition of the setting value is input, a new table is created and the setting value and the utilization status condition are stored therein.

Next, a method of transmitting an appropriate setting value to the network device by the management device 103 will be described by using a flowchart of FIG. 11. The principal unit of the process is the condition management unit 402 in the management device 103. Additionally, the input of the setting value to be transmitted to the network device 102 via the client device 100, the condition for transmitting the setting value, and the exclusion condition have been received in advance, and the creation of the setting value condition table (FIG. 10) and the exclusion condition table (FIG. 6) have been completed before carrying out the process.

First, in step S1101, the device information, for example, the model information, and the operation information, for example, the number of printing sheets and the consumption degree of the component, are acquired and received from the network device 102, and the process proceeds to step S1102. Next, in step S1102, it is determined whether or not the maintenance mode is being currently executed in the network device 102 that has transmitted the information. The process proceeds to step S1106 when the maintenance mode is being executed (Yes), and the process proceeds to step S1103 when the maintenance mode is not being executed (No).

Next, in step S1103, the above information received from the network device 102 is compared with the target model identifier 1101 and the utilization status condition 1002 in the setting value condition table of FIG. 10, and it is determined whether or not the network device 102 satisfies the transmission condition. The process proceeds to step S1104 when the transmission condition is satisfied (Yes), and the process ends when the transmission condition is not satisfied (No).

Next, in step S1104, the task management unit 403 is requested to create a task in which the setting value is transmitted to the network device 102 according to the above condition, and the process proceeds to step S1105. Next, in step S1105, the request for the transmission of the setting value from the network device 102 is received, and the process proceeds to step S1109.

In step S1106, the information received in the process of step S1101 is compared with the second condition, and it is determined whether or not the network device 102 satisfies the transmission condition. Specifically, the received information is compared with the target model identifier 1001 and the utilization status condition 1003 during the maintenance mode in the setting value condition table of FIG. 10, which are the second conditions, and it is determined whether or not the transmission condition is satisfied. The process proceeds to step S1107 when the transmission condition is satisfied (Yes), and the process ends when the transmission condition is not satisfied (No).

Next, in step S1107, a transmission task of the setting value is created based on the setting value condition table, and the process proceeds to step S1108. Next, in step S1108, executing all of the not-transmitted tasks that are included in the task management unit 403 is requested, and it is determined whether or not each task satisfies the exclusion condition included in the exclusion condition table in FIG. 6. The process proceeds to step S1109 when the task satisfies the exclusion condition (Yes), and the process proceeds to step S1110 when the task does not satisfy the exclusion condition (No). In step S1109, it is determined whether or not the maintenance mode is being currently executed in the network device, and the process proceeds to step S1111 when the maintenance mode is being currently executed (Yes), and the process proceeds to step S1112 when the maintenance mode is not being currently executed (No).

In step S1110, the task that satisfies the exclusion condition is deleted and the process ends. In step S1111, the setting value is transmitted to the network device 102, and a display unit of the network device 102 is requested to display the confirmation screen for confirming the change of the setting value. Accordingly, a selection result indicating whether or not the setting value set by the maintenance person is applied is received from the network device 102, and the process proceeds to step S1113.

In step S1113, the process proceeds to step S1115 when the setting value is applied (Yes), and the process proceeds to step S1114 when the setting value is applied (No). In the process of step S1114, the identifier of the network device 102 in which the setting value has not been applied is registered in the exclusion condition table (FIG. 6), and the process proceeds to step S1115. In step S1115, the transmitted setting value and the result applied to the network device 102 are registered as a task execution history, and the process ends.

Figure 11:
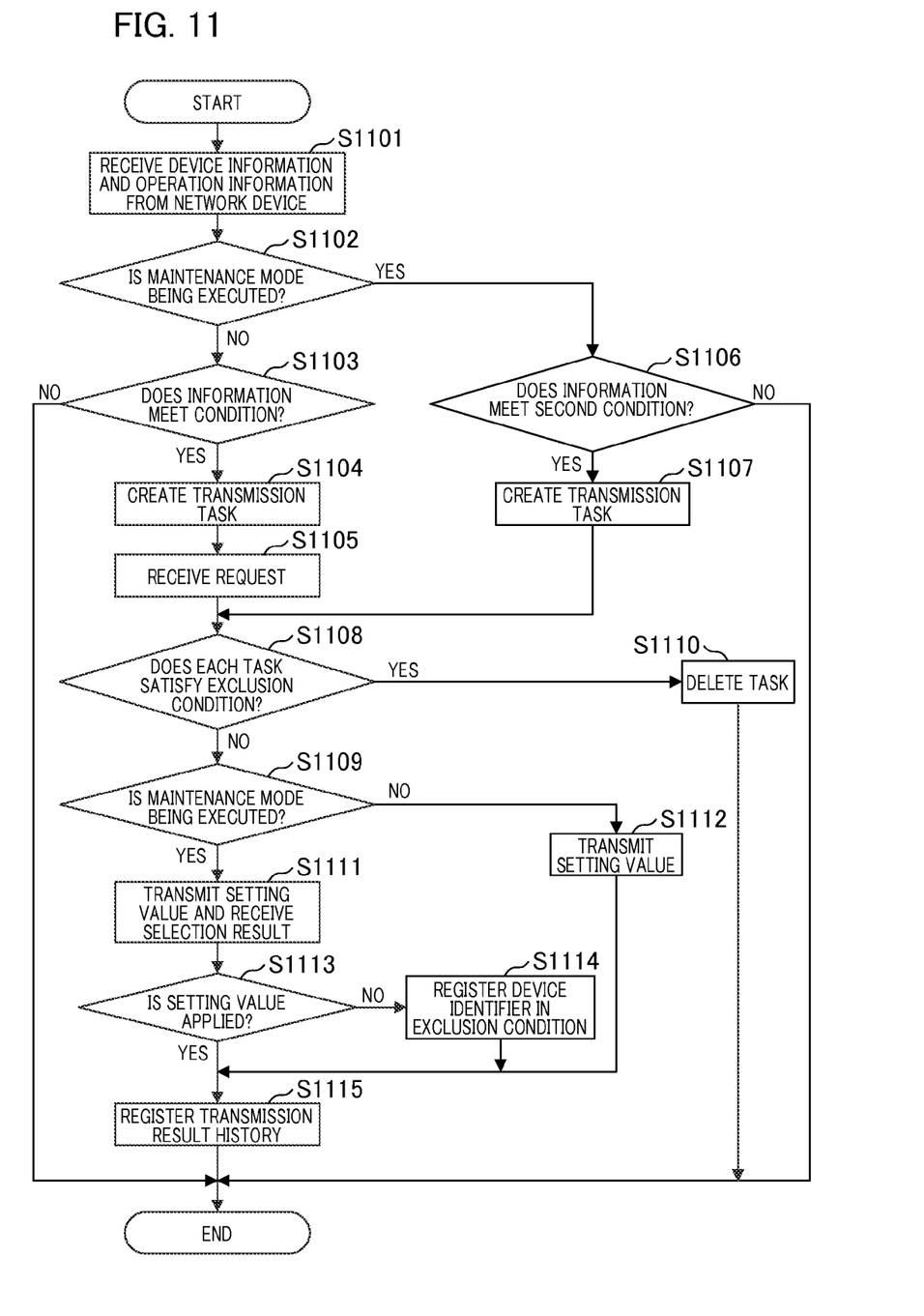
FIG. 11 is a flowchart of a process for transmitting the setting value to the network device.

The flowchart of FIG. 11 illustrates an example in which, in the process of step S1106, the determination is performed by using the utilization status condition during the maintenance mode. However, a process in which all of the setting values registered in the setting value condition table are transmitted regardless of the utilization status may be used here. Additionally, in the process of step S1101 in FIG. 11, when the maintenance mode is being executed in the network device 102, a configuration in which the information, for example, the consumption degree of the component, is transmitted in addition to a value that rises because of the test printing in the maintenance may be used.

The first embodiment exemplifies a configuration in which the setting value is transmitted to the network device when the maintenance mode is being executed, and the maintenance person selects whether or not the setting value is applied. In the first embodiment, the transmission condition of the setting value is satisfied when the test printing accompanying the maintenance is being executed by the maintenance person, and therefore the setting value may be changed immediately after the maintenance. In contrast, the present embodiment has a configuration in which, when the transmission condition of the setting value is likely to be satisfied by the printing related to the maintenance and by the printing by the user immediately after the maintenance, the setting value is previously transmitted to the network device and the change content is presented to the maintenance person. Therefore, it is possible to prevent the setting value that is not intended by the maintenance person from being transmitted and applied to the network device immediately after the maintenance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-056545, filed Mar. 19, 2014, which is hereby incorporated by reference wherein in its entirety.

What is claimed is:

1. A management system that collects operation information of a network device, the system comprising a memory and a processor in communication with the memory, the processor configured to control:
a management unit configured to manage a condition and a period for distributing a setting value to the network device;
a reception unit configured to receive the operation information of the network device;
a determination unit configured to determine whether or not the operation information of the network device meets the condition;
a decision unit configured to decide the setting value to be applied to the network device when the operation information meets the condition; and
a response unit configured to return the decided setting value to the network device when the acquisition of the setting value is requested from the network device via a network within the period,
wherein the response unit does not return the decided setting value to the network device when the acquisition of the setting value is requested outside of the period, and
wherein the decision unit decides, as the setting value to be applied to the network device, a setting value in relation to the detection of a delayed jam sensor when a consumption degree of a feeding roller satisfies the condition or a setting value in relation to writing coordinates on a paper during printing when a consumption degree of a photoreceptor unit satisfies the condition.

2. The management system according to claim 1, wherein when the reception unit further receives a notification that indicates that the network device is in an operation mode for service, the response unit returns a setting value that is decided after the operation information of the network device meets the condition to the network device.

3. The management system according to claim 2, wherein a log is recorded depending on whether or not the returned setting value is applied when the network device is in the operation mode for service.

4. The management system according to claim 3, the log is recorded when the returned setting value is not applied when the network device is in the operation mode for service.

5. The management system according to claim 1, wherein the operation information includes counter information indicating a consumption degree of each component that operates in the network device, status information of the network device, or error information of the network device.

6. The management system according to claim 1, wherein the network device is a printing device.

* * * * *